Jan. 1, 1924
H. N. HARPER
COOLING MEANS FOR INTERNAL COMBUSTION ENGINES
Filed May 25, 1922
1,479,412
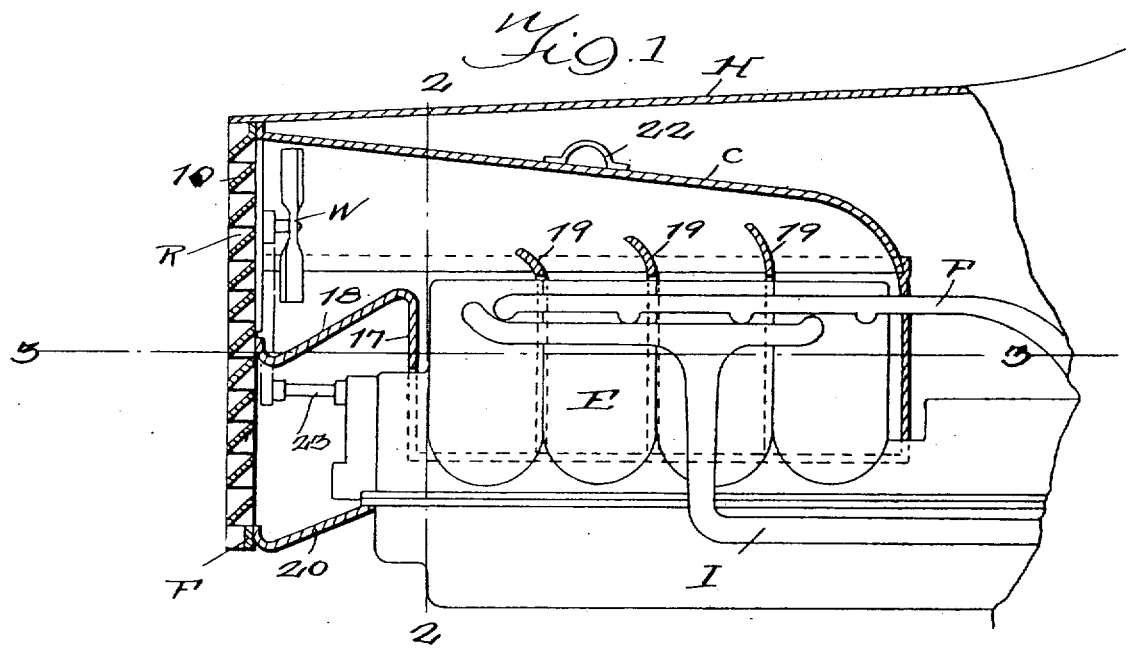
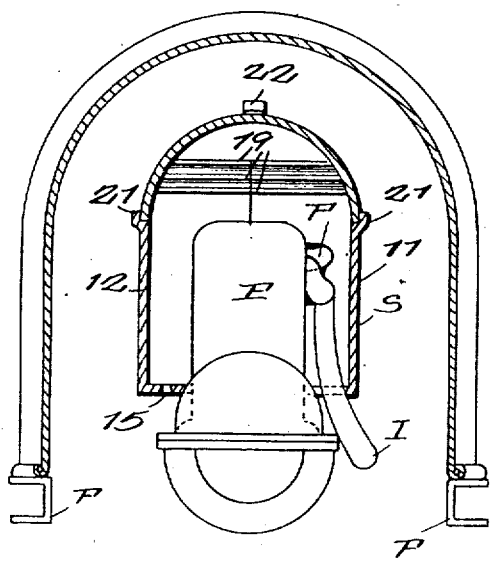
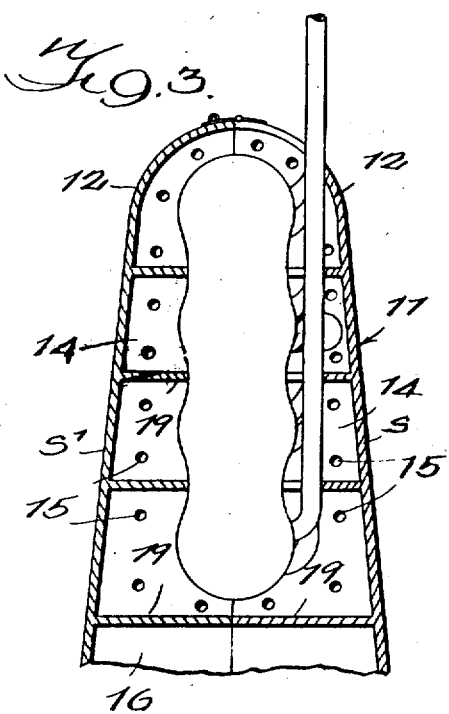
Inventor
H. N. HARPER,
By
Attorney Patented Jan. 1, 1924.

1,479,412

UNITED STATES PATENT OFFICE.

HENRY N. HARPER, OF RUSTON, LOUISIANA.

COOLING MEANS FOR INTERNAL-COMBUSTION ENGINES.

Application filed May 25, 1922. Serial No. 563,660.

*To all whom it may concern:*

Be it known that I, HENRY N. HARPER, a citizen of the United States, and a resident of Ruston, in the county of Lincoln and State of Louisiana, have invented certain new and useful Improvements in Cooling Means for Internal-Combustion Engines, of which the following is a specification.

This invention relates to internal combustion engines and more particularly to cooling means therefor.

The purpose of the invention is to provide an internal combustion engine associated with a motor vehicle or the like may be efficiently cooled by air.

Other objects and objects relating to details of construction, combination and arrangement of parts will hereinafter appear in the detailed description to follow.

In carrying out the invention it is contemplated to utilize a housing which is adapted to enclose the engine of a motor vehicle and to associate with said housing means whereby air may be circulated therethrough and thus to efficiently cool the engine.

The invention is illustrated by way of example in the accompanying drawings, in which:—

Figure 1 is a view in sectional elevation of the forward portion of a motor vehicle to which the present invention has been applied.

Figure 2 is a vertical sectional view taken substantially on the line 2—2 of Figure 1.

Figure 3 is a horizontal sectional view taken substantially on the line 3—3 of Figure 1.

Referring to the drawings more particularly, E indicates generally an engine associated with a motor vehicle and H the usual hood therefor. At R is shown a radiator of singular construction to meet the requirements of the present invention, and at F is indicated the frame members of the motor vehicle by which the engine is supported and also upon which the hood H rests.

The radiator R, in this instance, consists in a frame F' supporting a plurality of superposed and spaced plates 10, and said frame being adapted to be supported in the forward end of a motor vehicle, the same as an ordinary radiator used in a water cooling system for engines on motor vehicles. The plates 10 are inclined, as shown, and adapted to direct air passing therethrough upwardly.

For housing the engine E there is provided a pair of sections S and S', each section consisting in a longitudinal wall 11 which is curved inwardly as at 12 at its rear end, and said walls 11 being adapted to extend between the radiator R and at a point to the rear of the engine E, as illustrated in Figure 1. Each section S and S' is also formed along its lower edge with an inwardly extending flange 14, said flange in each instance being provided with a large number of orifices 15. The inner edge of each flange 14 is irregular so that the same may fit against the cylinders of the engine to which they may be applied. Forward to the engine these flanges 14 are extended as at 16, Figure 3, and then proceed in an upwardly or vertical extending portion 17 in each instance and then terminating in a forwardly and downwardly extending portion 18, Figure 1. The portion 18 abuts the radiator R at the point shown for a purpose which will later be described.

The wall 12 of the section S is formed with suitable slots and openings whereby the exhaust pipe indicated at E may be accommodated and also the intake pipe at I. Other openings may also be made to accommodate different fixtures or attachments of the engine which must extend through the sections S or S'. Each section S and S' is also formed with a plurality of spaced vertical walls 19, said walls being adapted, when the sections are fitted about an engine, to form compartments in an apparent manner, and the upper portions of these walls being extended so that a plurality of transverse division walls will project above the associated engine E. These division walls 19 are curved forwardly, as shown, and in step formation, the rearmost wall being the highest.

Between the forward end of the engine and the radiator there is extended a plate or sheet metal closure 20 and thereby to cause air passing through the lower portion of the radiator to proceed beneath the engine E and beneath the housing sections S and S'.

Each section S and S' has its upper longitudinal edge formed with a lip or projection 21. A cover C for the sections S and S' is provided, said cover being generally indicated at C and having its lower edge so curved that it will be received within the projections 21 formed upon the upper longitudinal edges of the sections S and S'. The rear end of the cover C forms a closure with the housing sections S and S', while its forward end is open to the upper portion of the radiator R, as illustrated in Figure 1. The cover may also be provided with a handle 22 by which the same may be positioned or removed.

Also there is carried by the radiator, a fan W, said fan being supported in any suitable manner and may be driven from the cam shaft 23.

The operation of the present invention is as follows: Upon the motor vehicle advancing, air passing through the upper portion of the radiator R will pass rearwardly beneath the cover C and be deflected downwardly by the division wall portions 19 and thereby to strike the different cylinders of the engine E for cooling the same. This air will continue down the sides of the engine cylinders and pass through the orifices 15. Also with the forward movement of the motor vehicle, air will pass through the lower portion of the radiator R and beneath the cylinders of the engine E and thus aid in drawing the air through the orifices or openings 15 in the housing sections S and S'. As is obvious by this arrangement a rapid circulation of the air about the engine cylinders is accomplished.

The fan W will operate whenever the engine E is running. This may occur when the motor vehicle is standing still or when it is moving and thus the fan W at all times insures that a circulation of air about the cylinders of the engine E is had. Also the fan insures a more rapid circulation with the forward movement of the motor vehicle.

I claim:—

1. In a motor vehicle, a housing having a perforated bottom and adapted to be positioned about the engine of the motor vehicle, said housing having a mouth or opening at its forward end and adjacent the upper end thereof, means for forcing air through the mouth or opening, and partitions whereby with the forward movement of the motor vehicle a second and separate current of air will be caused to move beneath the engine cylinders and thereby draw air from the perforated bottom of said housing.

2. In combination with an engine of a motor vehicle, a housing adapted to enclose the engine, said housing comprising a pair of bottom sections adapted to extend about the sides of said engine and also to form a perforated bottom wall beneath said engine, a top section adapted to form with said bottom section a cover for said engine, said bottom sections and top section being also formed to provide a mouth for the housing at the forward and upper end thereof, whereby air may be injected into said housing.

HENRY N. HARPER.